May 24, 1927.
J. F. HERRING
1,630,006
DEVICE FOR APPLYING TIRE CHAINS
Filed July 14 1926
7 Sheets-Sheet 1
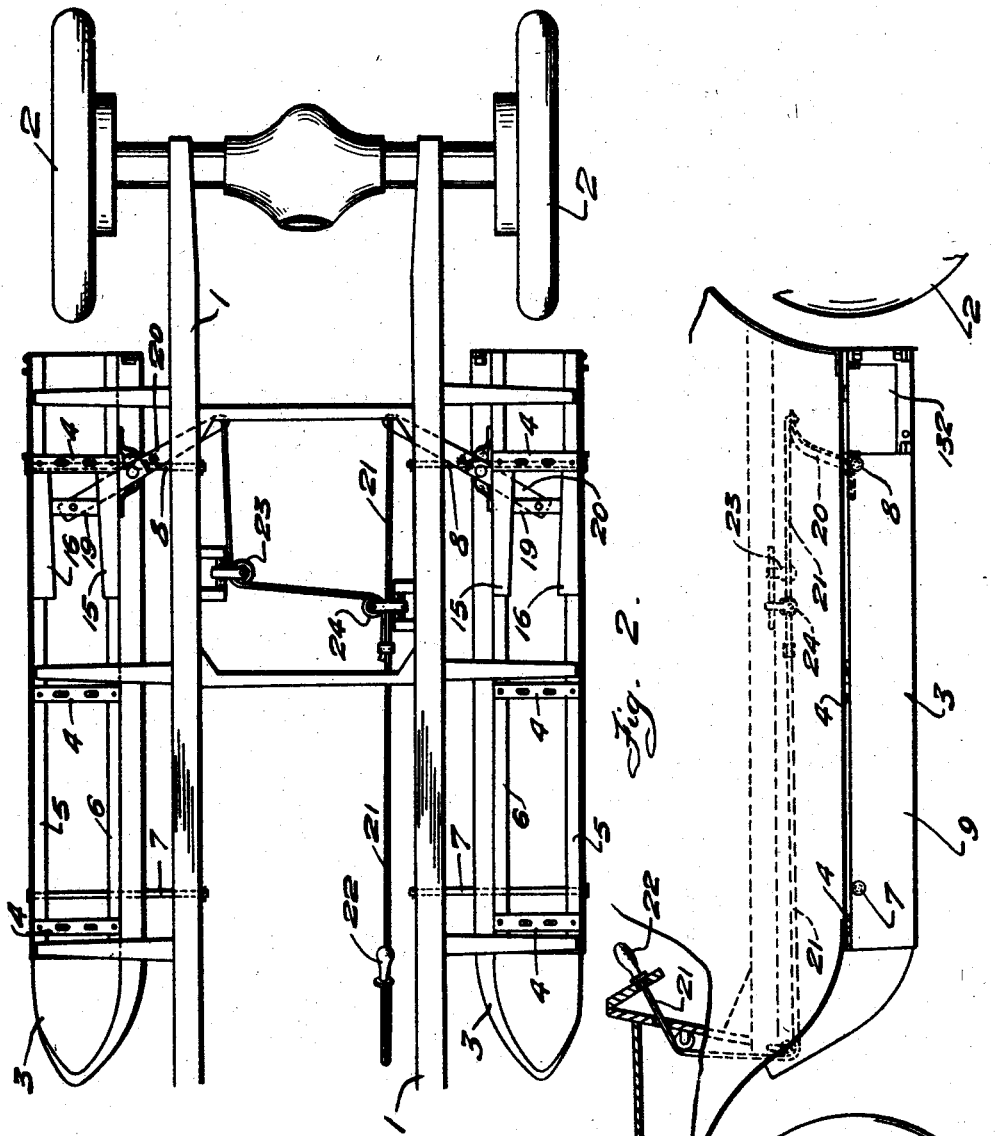
Inventor
Jacob F. Herring
By
Attorney May 24, 1927.
J. F. HERRING
1,630,006
DEVICE FOR APPLYING TIRE CHAINS
Filed July 14 1926
7 Sheets-Sheet 2
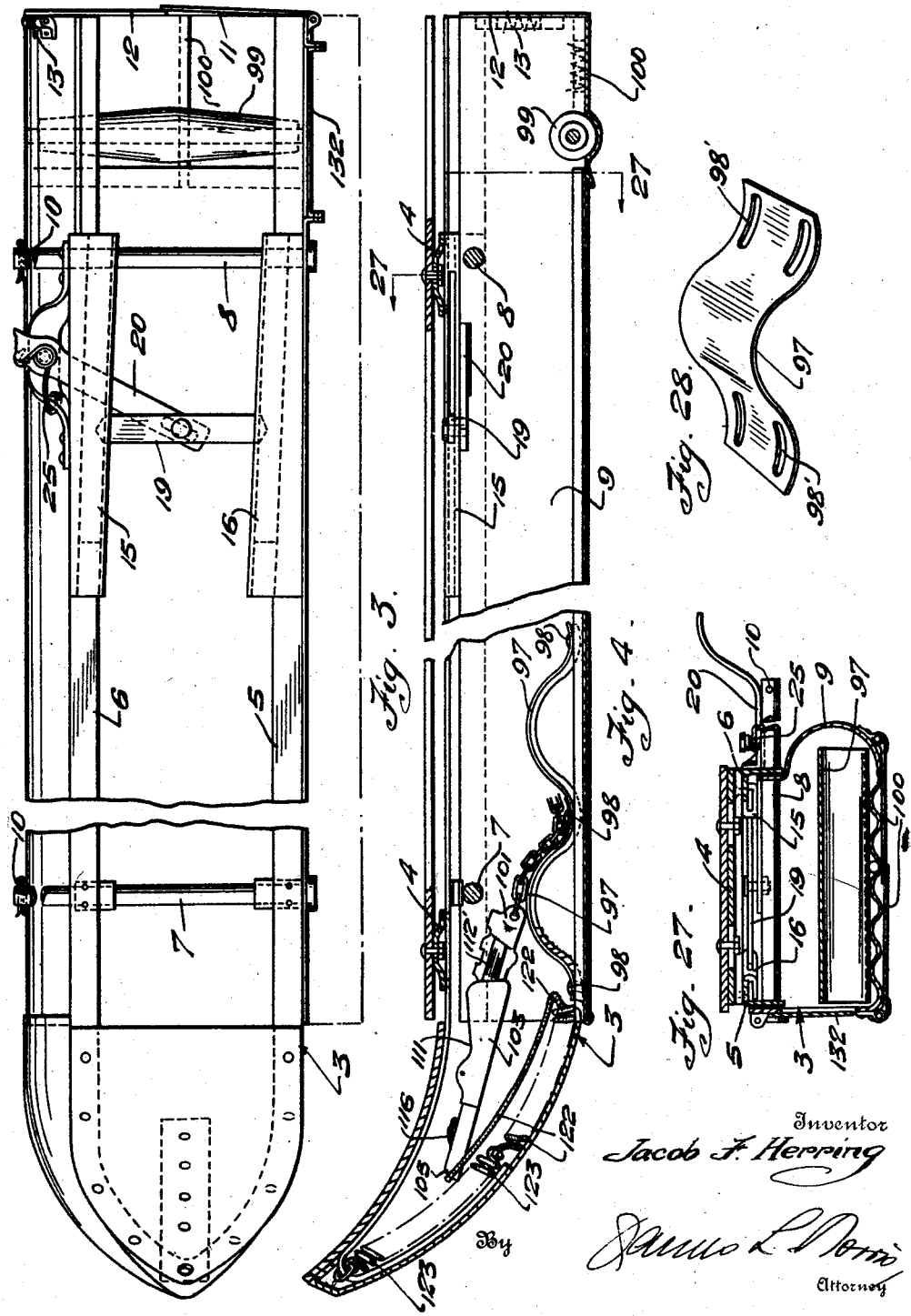

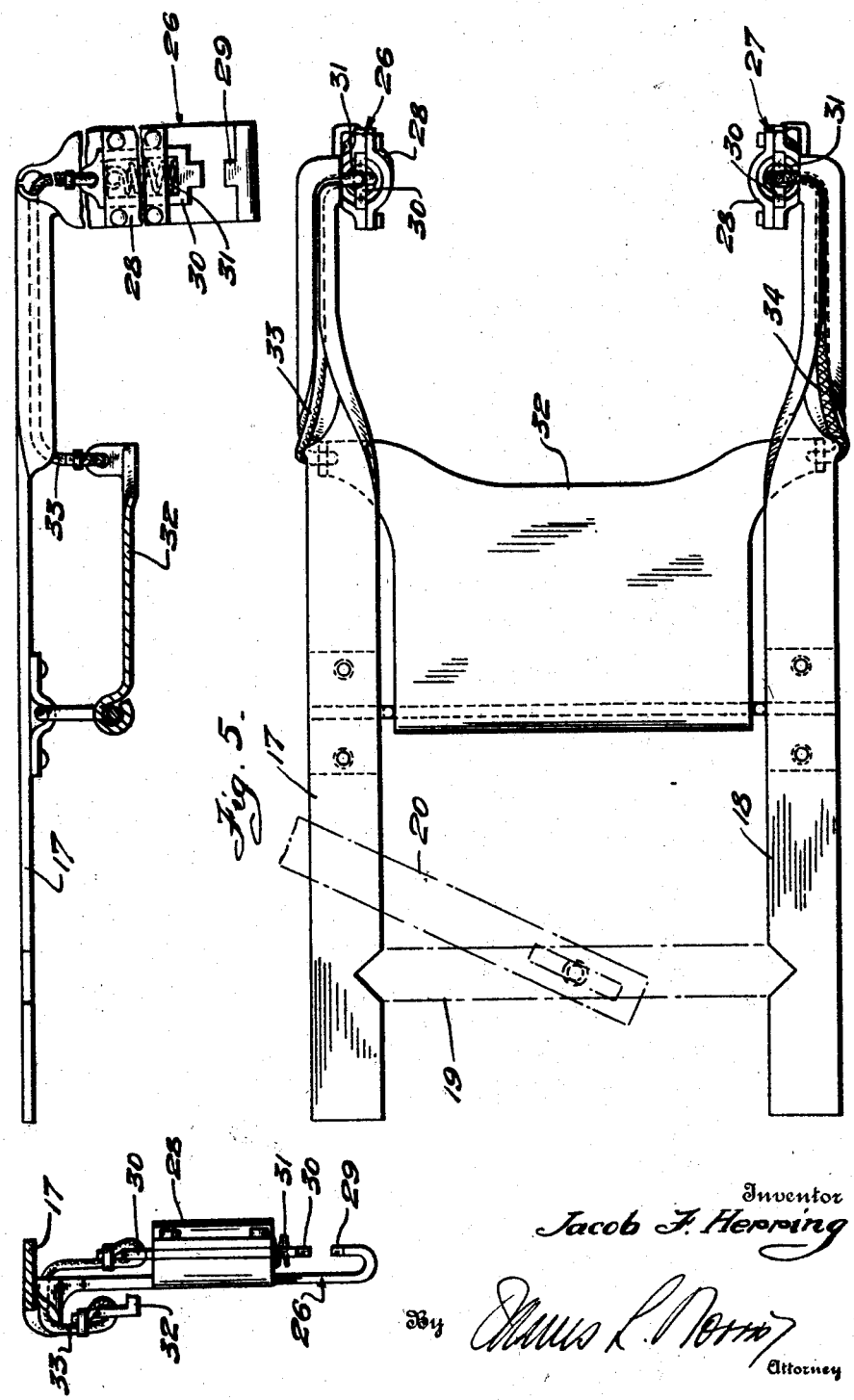

May 24, 1927.
J. F. HERRING
1,630,006
DEVICE FOR APPLYING TIRE CHAINS
Filed July 14 1926   7 Sheets-Sheet 4
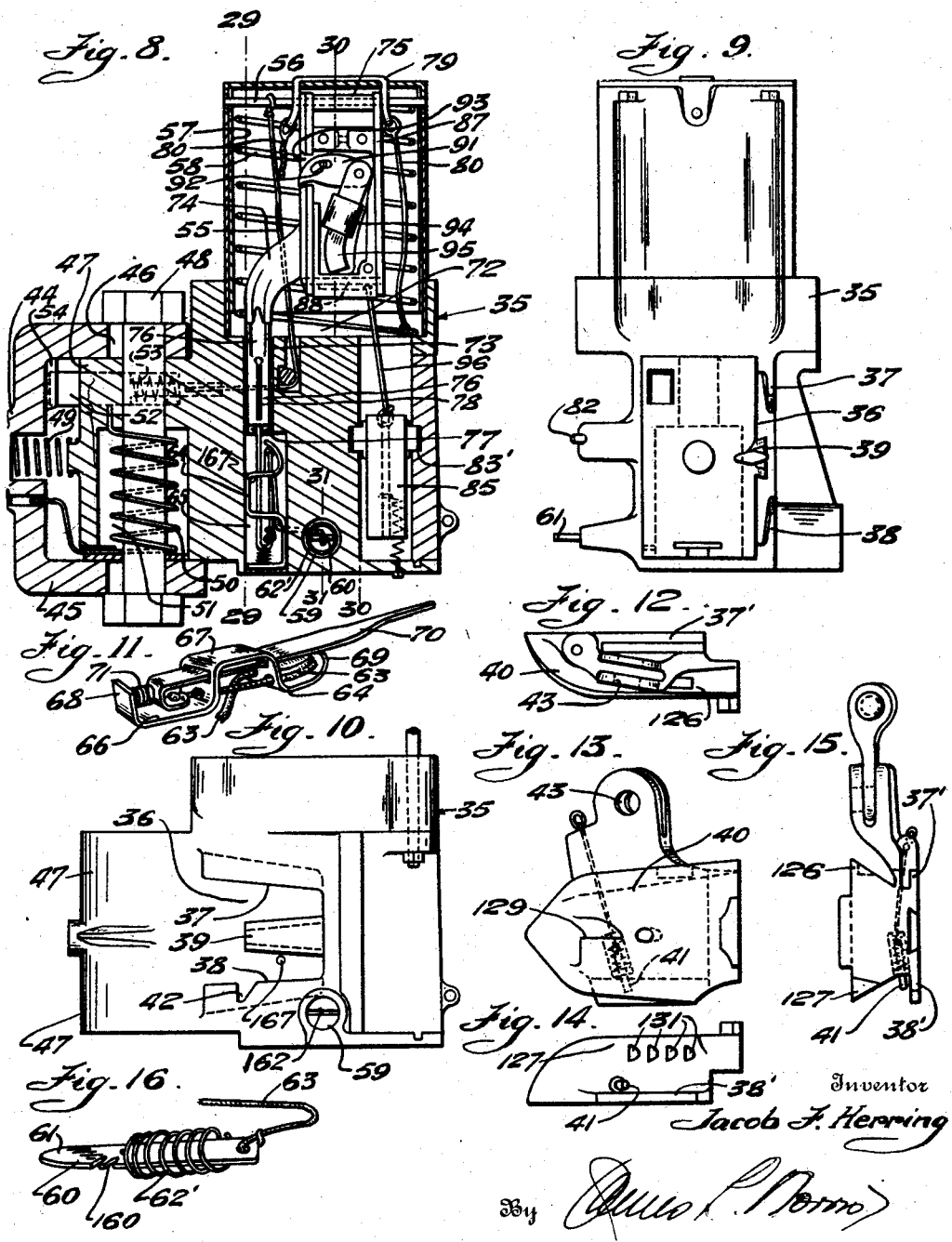

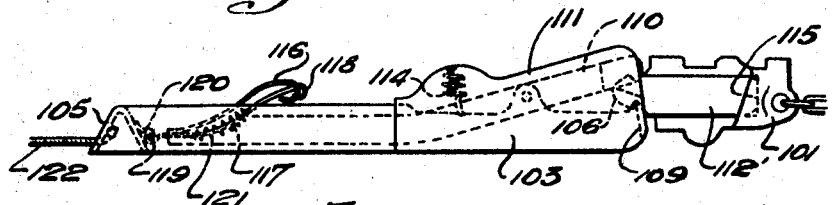
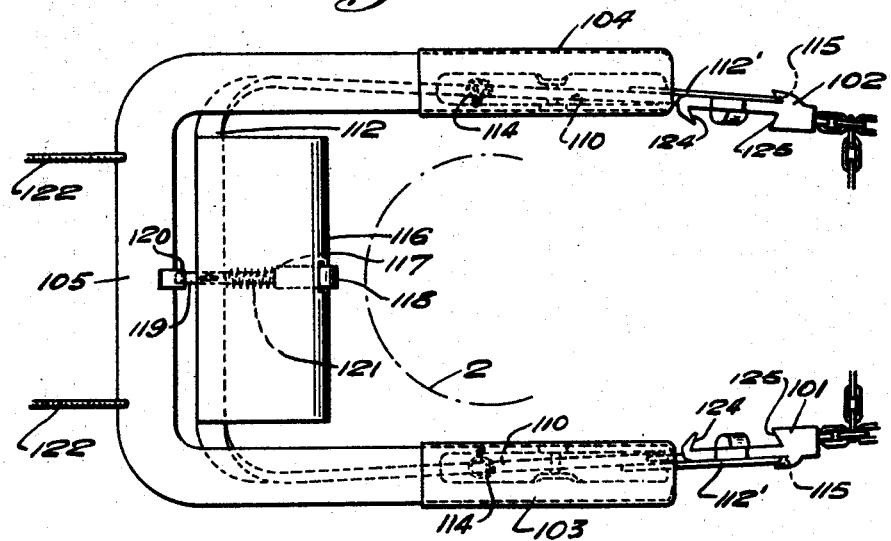
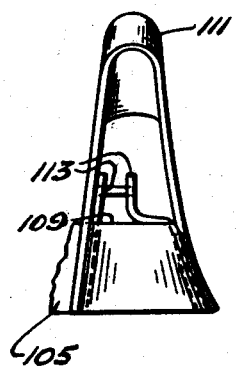
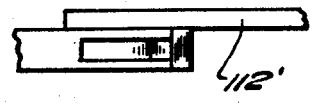
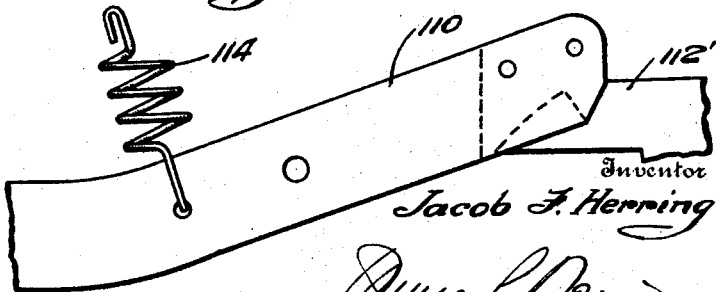

May 24, 1927.
J. F. HERRING
1,630,006
DEVICE FOR APPLYING TIRE CHAINS
Filed July 14 1926        7 Sheets-Sheet 6
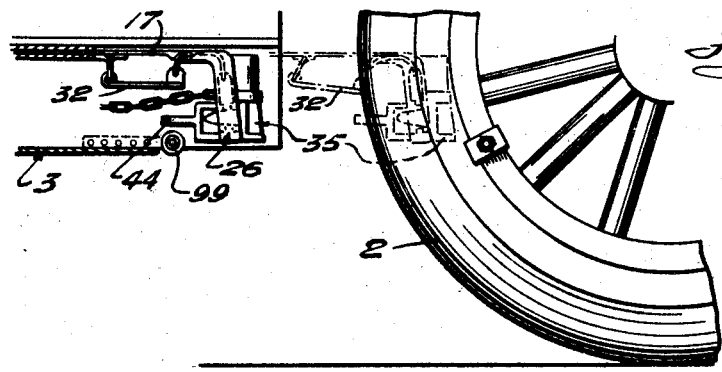
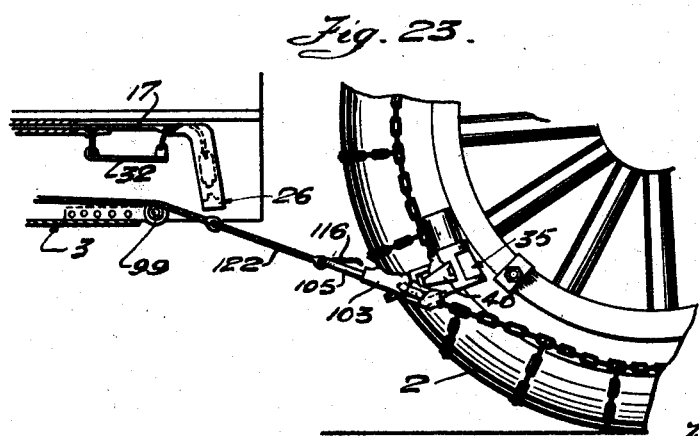
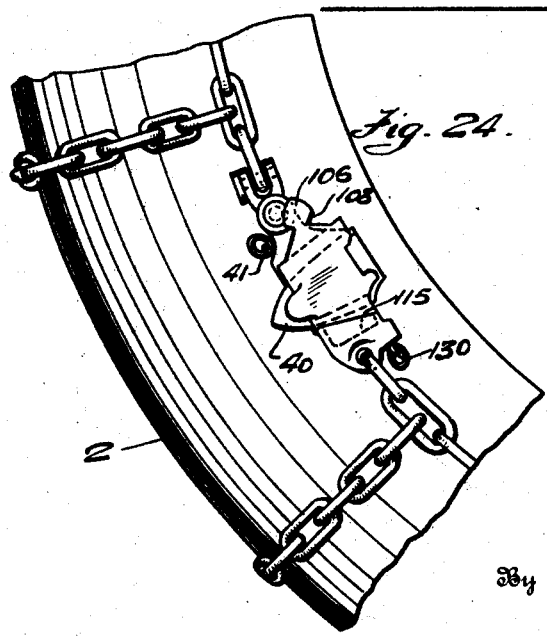
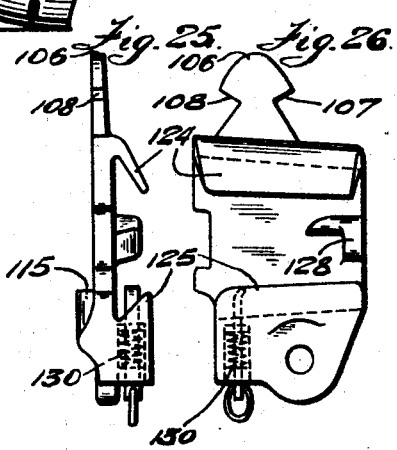

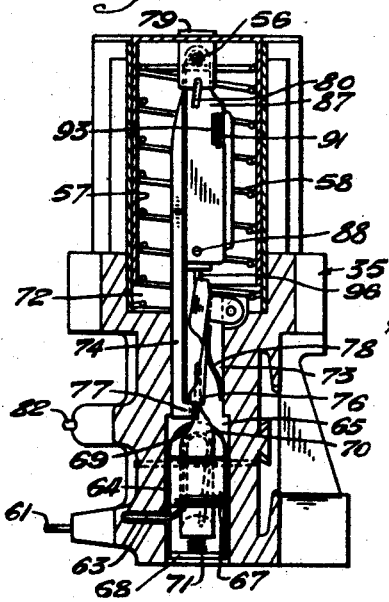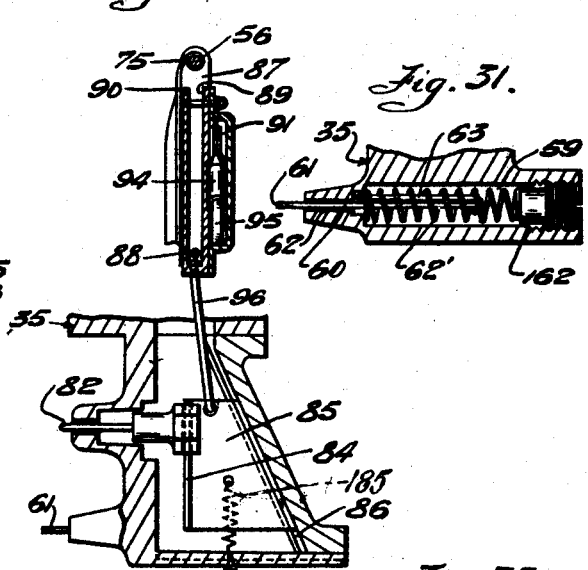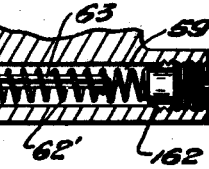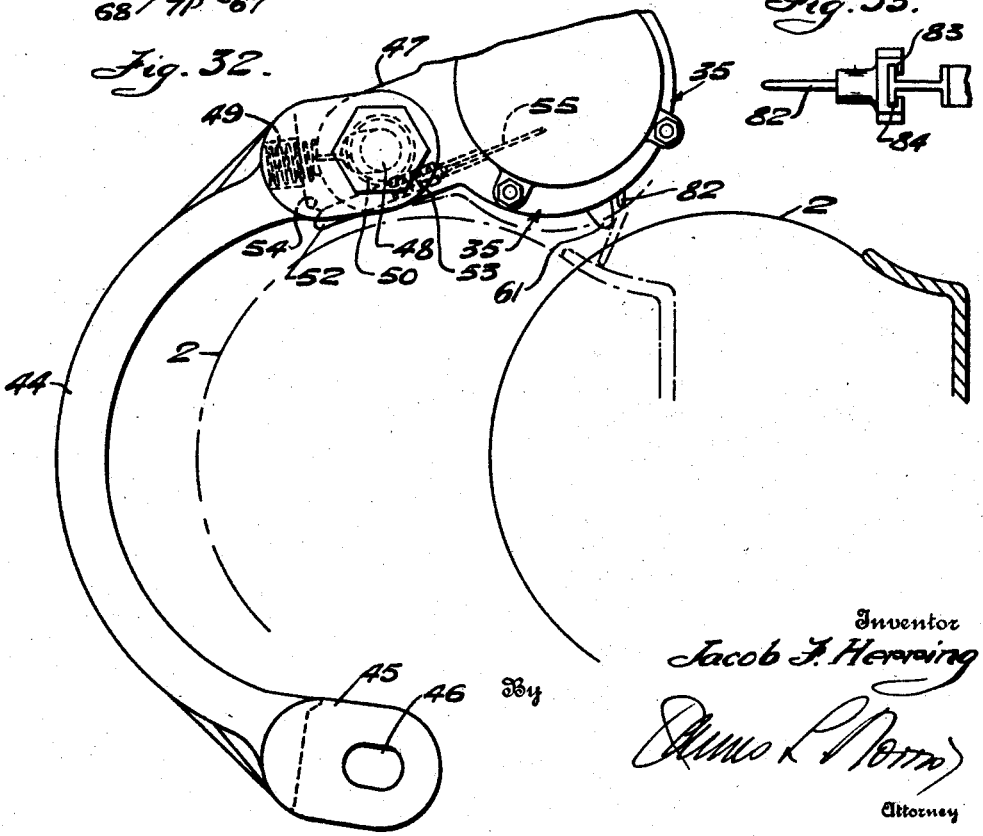

Patented May 24, 1927.

1,630,006

UNITED STATES PATENT OFFICE.

JACOB F. HERRING, OF STAUNTON, VIRGINIA, ASSIGNOR OF ONE-HALF TO WILLIAM SPECTOR, OF STAUNTON, VIRGINIA.

DEVICE FOR APPLYING TIRE CHAINS.

Application filed July 14, 1926. Serial No. 122,407.

This invention relates to devices for applying anti-skid chains to the wheels of auto vehicles, and it has for its principal object the provision of means for automatically applying the chain to the tire and securing the ends thereof together without the necessity of touching the chain with the hands or of raising the wheels on jacks.

Another object of the invention is to provide means operable at will, preferably from the driver's compartment, for presenting the chain to the tire, and wheel actuated means for disposing the chain circumferentially about the tire and locking the ends of the chain together.

Other objects of the invention relate to the several inventive principles physically employed in the structural organization of the following practical embodiment of the invention.

In the drawings in which similar reference characters are used to denote identical parts, Figure 1 is a plan view of a portion of the chassis of an auto vehicle showing the casings in which my novel device for applying anti-skid chains, and the chains themselves are housed, showing also the operating mechanism.

Figure 2 is a side elevation, part being in section and part being omitted, of the chassis shown in Figure 1.

Figure 3 is a plan view on an enlarged scale of one of the casings.

Figure 4 is a side elevation partly in section of the casing shown in Figure 3.

Figure 5 is a plan view of the carriage which presents the chain to the tire.

Figure 6 is a side elevation, partly in section of the same.

Figure 7 is a side elevation, partly in section, of the end of one side of the carriage showing the latch for the gripping magazine.

Figure 8 is a vertical section through the gripping magazine, and the end of the coupling yoke.

Figure 9 is an end elevation of the gripping magazine.

Figure 10 is a side elevation of the same.

Figure 11 is a perspective view of the release actuator.

Figures 12, 13, 14 and 15 are respectively top plan, side elevation, bottom plan, and end views of the forward chain hook, Figure 16 is a perspective view of the tire-engaging trigger.

Figures 17 and 18 are respectively side elevation and plan views of the rear hook-holding yoke, the rear chain hooks being shown in position.

Figure 19 is an end view of one of the ends of the rear hook-holding yoke.

Figure 20 is a side elevation on an enlarged scale showing one jaw of the rear hook-holder.

Figure 21 is a plan view of a portion of said jaw showing the lower hook-engaging tooth.

Figure 22 is a side elevation of a portion of the chassis and rear wheel of the auto vehicle showing, in dotted lines the position of the presenting carriage in operative relation to the wheel.

Figure 23 is a similar view showing the forward and rear chain hooks about to interlock.

Figure 24 is an enlarged side elevation showing the forward and rear chain hooks interlocked.

Figures 25 and 26 are respectively end and side elevations of the rear chain hook.

Figure 27 is a cross section taken along the line 27—27 of Figure 3.

Figure 28 is a perspective view showing one of the resilient plates forming a chain bed.

Figure 29 is a section taken along the line 29—29 of Figure 8.

Figure 30 is a section taken along the line 30—30 of Figure 8.

Figure 31 is a section taken along the line 31—31 of Figure 8.

Figure 32 is a plan view of the connecting yoke for the gripping magazines showing a portion of one of said magazines in operative position relative to a tire.

Figure 33 is a plan view of the spur shown in Figure 30.

Referring now in detail to the several figures, the numeral 1 represents the chassis frame of an auto vehicle, having the rear driving wheels 2. The present device is designed to be arranged in a casing 3 beneath the running-boards, and with this end in view the casing is suitably secured in place by braces 4 bolted to the running-boards, said braces being pivotally or otherwise secured to the longitudinal angle irons 5 and 6 forming side members of the casing 3. Transverse rods 7 and 8 are slidably arranged in suitable apertures in the angle irons 5 and 6 from which rods the lower member 9 of the casing depends, being slidable outwardly with said rods beyond the edges of the running-boards so as to give convenient access to the inside of the casing. The rods are preferably provided with holes 10 for the reception of cotter pins or other similar means to prevent the rods being drawn out too far when the casing is opened. The rearward ends of the casing open toward the rear wheels and are provided with doors 11 and 12 maintained normally shut by springs 13 but swingable to an open position in both directions.

Within the casing, close to the plane of the top thereof a pair of guide channels 15 and 16 are secured. Said channels act as track-ways for a carriage presently to be described. In some instance the guide channels may extend parallel to the sides of the casing, but in the present illustrative embodiment of the invention, the same is shown as applied to a popular make of light car in which the rear wheels are not in the median longitudinal line of the running-boards, and therefore the guide channels 15 and 16 are laterally inclined toward the rear wheels so that each chain will be presented by its carriage evenly on both sides of the tire. The carriage consists of a pair of parallel side members 17 and 18 connected by a cross member 19. The longitudinal side members slide in the channelled guideway, being impelled in a direction toward the tire by a lever 20 connected by means of a pin and slot connection to the cross member 19 and operated by a cable 21 leading to a hand-control 22 within easy reach of the driver of the auto vehicle. Since there are two carriages, one for each casing, and two levers 20, the cable 21 is branched, a branch leading to each of said levers, one of said branches passing around suitable pulleys 23 and 24, so that the levers are pulled equally in the same direction by manipulation of the hand-control. When the hand-control is released, the levers 20, together with the carriages are returned to initial position of repose through the instrumentality of springs 25 cooperatively associated with said levers.

The forward ends of the side members 17 and 18 of each carriage are provided with latches 26 and 27 designed to releasably hold members hereinafter designated as gripping magazines and soon to be described. Each of the latches consists of a casing 28 having a fixed jaw 29 and a movable jaw 30, the latter being normally urged toward the jaw 29 by means of a spring 31 preferably concealed within said casing and co-acting between a fixed pin on said casing and a portion of the jaw 30. The carriage is provided with a hinged trigger plate 32 to which are fastened cables 33 and 34, the opposite ends of said cables being secured to the movable jaws 30. When the carriage is advanced to a position in which the trigger makes contact with the tire, the trigger plate is turned downwardly by the movement of the wheel, pulling on the cables 33 and 34 and moving the jaws 30 upwardly so as to release whatever is held between the fixed and movable jaws.

The gripping magazines 35, of which there are two for each carriage one on each side, are each provided on its outer side with a recess 36 having overhanging flanges 37 and 38 at the top and bottom forming channels which taper in a vertical plane toward the forward end of the magazine. The central portion of the recess may be formed with a dove-tailed plateau 39 oppositely tapered. The recesses 36 are designed to receive and hold the forward chain hooks 40 one of which hooks is shown in the several views embraced in Figures 12 to 15 inclusive. Each hook has a flat face adapted to co-act with the walls of the recess 36. Said face being formed with flanges 37' and 38' which fit in the channels formed by the flanges 37 and 38 on the magazine, and with a recess which corresponds in shape with the plateau 39 and is designed to receive the same. When the forward chain hook is slipped into the recess 36 from the rear open end thereof, it wedges in said recess due to the tapered walls thereof becoming fixed therein, the tapered walls also acting to limit the distance to which said hook may be moved in a forward direction relatively to the gripping magazine in assembling the device.

The forward chain hooks are each provided with a spring-actuated plunger 41 which automatically slips into a recess 42 formed in the lower wall of the recess 36 when the chain hook is slipped into place. The chain hook is provided with an eye 43 for the attachment of the anti-skid chain. The chain hooks are also provided externally with flanges 126 and 127 for engagement by the jaws 29 and 30, by which means the gripping magazines are held by the carriage. Other features of the chain hooks will be described later when it comes time to describe the rear of the chain hooks with which the forward chain hooks finally cooperate.

The gripping magazines are coupled together by means of a yoke 44 having bifurcated ends 45 formed with elongated aligned apertures 46. The gripping magazines are each provided with rearwardly extended lugs 47 apertured to receive a bolt 48, the latter extending through the elongated apertures 46. The shape of the apertures 46 permits a certain amount of forward and backward play between the gripping magazine and the yoke, permitting the action of the shock absorbing spring 49 which is located between the back of the bifurcated portion of the yoke and the gripping magazine.

A spring 50 surrounds the bolt 48, said spring being housed in a counterbore 51 in the lug 47 and re-acting between the yoke and gripping magazine, tending to bias the gripping magazine normally inwardly toward the tire of the auto vehicle. The gripping magazines are, however, normally maintained away from the tire against the tension of the springs 50 by means of plungers 52 urged outwardly by springs 53 against abutments 54 formed in the ends of the yoke. The plungers 52 are each connected by means of a cable 55 or other suitable flexible means to a pin 56, Fig. 8, carried transversely of a cylinder 57, the function of which is to rise by expansion of an enclosed spring 58 when certain release mechanism soon to be described is actuated. When the cylinder goes up, the cable 55 is pulled, withdrawing the plunger 52 against the tension of the spring 53 away from the abutment 54 permitting the gripping magazines to move inwardly toward the tire under the urge of the springs 50.

The gripping magazines are provided with bores 59 extending transversely therethrough in which are housed the tire triggers 60. Each of these triggers consists preferably of a flat member the nose 61 of which is adapted to be protruded through a slot 62 forming the inner terminus of the bore 59. A spring 62' is positioned within the cylindrical part of said bore and its function is to cause the protrusion of the trigger plate when the latter is released. One end of the spring abuts against fixed means such as the closing plug 162 in the end of the bore 59. The tension of the spring may be adjusted by hooking the spring selectively in any one of the notches 160 with which the triggers 60 are provided. The trigger plate is connected by means of a cable 63 or the like to release actuating mechanism denoted in general by the reference character 64 and housed in a recess 65 in the gripping magazine. When the carriage is operated to present the tire applying device to the wheel, the nose 61 of the trigger 60 engages the tire pulling upon the cable 63 and operating the release actuating mechanism.

The release actuating mechanism consists of a frame 66 bent to form an intermediate loop 67 and angularly bent ends 68 and 69. A pin 167 intersects the recess 65 passing through the loop 67 and being anchored in the body of the gripping magazine. Said pin holds the release actuating mechanism against displacement. The sides of the loops 67 are slotted and a cam bolt 70 passes through the slots. A spring 71 normally holds the cam bolt in retracted position, but it is pulled into active position in the opposite direction against the tension of said spring by means of the same cable 63 which is attached to the tire trigger. When the trigger engages a tire it is retracted as hereinbefore described pulling on the cable 63 and in return projecting the cam bolt 70. It will be understood that there are a pair of tire triggers one projecting toward and into the path of the tire from each side of the chain applying device as the latter is presented to the tire by the forward movement of the carriage. The tire is of larger cross section than the width of the rim and extends beyond the rim on both sides. The actuation of the tire triggers by the tire is preliminary to the engagement of the rim by other devices projectable into contact with the rim by instrumentalities which will now be described. The gripping magazine is provided with a well or depression 72 in its top having a counterbore 73 in its bottom wall communicating with the recess 65. The lower end of an arm 74 is reciprocable in said counterbore, the upper end 75 of said arm being bent around the pin 56 so as irremovably to engage the same. Said arm therefore is subject to the vertical reciprocatory movement of the cylinder 57 under the contraction and expansion of the spring 58. A catch 76 is fixedly positioned within the counterbore 73 and so operatively related to the lower end of said catch as to engage an upwardly facing shoulder 77 on the arm 74 in the normal position of the catch, preventing the rise of said arm, and in another position of said catch it is moved out of the way of said shoulder permitting the elevation of the arm 74. Normally, that is to say when the chain applying device is set or in inoperative position the shoulder 77 is below the catch. This position of parts is assumed by the operator pressing upon the top of the cylinder 57 and depressing the spring 58 permitting the descent of the arm 74. The latter is held in set position by the catch, through a spring 78 fixed to said catch and engaging the wall of said counterbore in a way to normally maintain the catch in the path of the shoulder 77. The cam bolt 70 is adapted when advanced to immerge itself between the catch and arm 74, forcing the catch away from the shoulder 77 against the resistance of the spring 78 until the shoulder slips by the catch permitting the rise of the arm 74 and the cylinder 57 under the urge of the spring 58. The upward movement of said cylinder and spring is limited by means of a yoke 79 secured in any suitable manner to the top of the cylinder and anchored to the floor of the recess 72 by cables 80 or other means of suitable length.

The ultimate function of the spring 58 is to operate means for gripping the rim of the wheel and in order that this grip shall be firm in character the spring 58 has considerable strength.

The rim gripping means is, in the main, housed in the gripping magazine and includes a spur 82 projectable through a hole in the body of said magazine, into the path of the rim. The rearward end of said spur is formed with a T-shaped slot 83 engaging a correspondingly shaped track 84 on a wedge shaped cross-head 85 the latter in turn sliding in a track 86 which is inclined to the direction of movement of the spur 82. The rearward end of said spur is formed on the outside with guides 83' sliding in transverse grooves in the body of the gripping magazine. For convenience in assembling the spur and cross-head, that part of the gripping magazine which carries the inclined track and houses the spur and cross-head is made as a separate part of said magazine and attached thereto in any suitable manner. The cross-head 85 is made to reciprocate vertically, thereby forcing the spur 82 in or out, as the case may be, said cross-head being movable with the pin 56 in one direction, and returnable by the spring 185 shown in Figure 30, in the other direction. In order to avoid communicating the shock of the impact of the spurs 82 with the rigid rim of the wheel to the other mechanism within the gripping magazine, the connection between the cross-head and pin 56 is made indirect through the following shock absorbing mechanism. A link 87 is provided swingable at its upper end about the pin 56 and having a bar 88 at its lower end movable in a vertical direction between the spaced front and back sides 89 and 90 of a frame carrying the shock absorbing mechanism. This mechanism consists of a pawl 91 having a pin and slot connection with the frame, indicated by the reference numeral 92, the nose of said pawl projecting beyond said frame and through a recess 93 in one side of the link 87. The end of said pawl opposite the nose thereof is pivotally connected to a socket 94, but free from the frame, said socket carries a piece of india rubber 95 or its equivalent capable of yieldingly bearing against a side of said frame. When the spring 58 is released by the upward movement of the cam bolt 70, the pin 56 is forcibly raised, lifting the link 87 so that the lower wall of the recess 93 comes into contact with the nose of the pawl 91, raising the latter, shifting it about the pivot 92 and bringing the rubber cushion 95 into yielding engagement with the frame. At this point the motion of the link 87 is taken up by the frame, the lower portion of which is suitably connected as by a cable 96 to the cross-head, lifting the latter, and through the wedge-like action of the cross-heads imparting a powerful outward thrust to the spurs 82, driving them into firm contact with the rim of the wheel, so that in this manner the yoke 45 and gripping magazines 35 become firmly attached to the wheel and rotate therewith. It is to be understood that the foremost link of the tire chain on each side is permanently secured through the eyes 43 to the forward chain hooks 40.

The chains lie housed within the casings 3 and it is quite essential that they be arranged in such orderly fashion that they will issue from the casing smoothly and in proper condition to drape themselves about the tire as the wheel rotates. Since the circumference of the wheels and therefore the length of the chains is greater than the length of the casings, the chains are arranged in undulating fashion within the casing. To accomplish this purpose a plurality of resilient arched plates 97 are arranged in series along the bottom of the casing, the ends of the adjacent arched members overlapping and being freely secured to the bottom of the casing by means such as the rivets 98 passing through the overlapping slots 98'. Normally, the resiliency of the arched members is such as to cause them to maintain a wave-like form, effectively increasing the length of the bottom of the casing so that the chain may be stowed in said casing at full length. When, however, the gripping magazines become attached to the wheel the chains are dragged out of the casing with a progressively increasing tension as the chains become taut, causing the resilient arched members 97 progressively to flatten, until finally they lie substantially flat opposing no obstruction to the withdrawal of the chains. The forward part of the chain preferably passes over an anti-friction roller 99, and the bottom of the casing forwardly of said roller is preferably formed with downwardly opening spring doors 100 which incline downwardly under the weight of the chain as the latter is pulled by the rotation of the wheel, toward the underneath part of the wheel.

Rear chain hooks 101 and 102 are carried by the final links of the anti-skid chains, on each side, and while the chains are in the casing said rear chain hooks are held by hook holders 103 and 104 carried at the ends of rear hook-holding yokes 105. The rear chain hooks are each formed with a rearwardly directed head 106, Figure 26 having upper and lower shoulders 107 and 108 capable of being engaged between the jaws 109 and 110 of the rear hook holder and normally retained in gripping engagement by said jaws. The rear hook-holding yoke 105 comprises in the present instance an inverted V-shaped channelled member having forwardly extending parallel sides. The forward ends of the hook-holding yoke incline upwardly as shown at 111 to house the upper jaw 110 of the hook-holder. The lower jaw 109 is formed as part of the hook-holding yoke and projects rectilinearly in the plane of the main part of said yoke. The upper jaws are formed at the end of a U-shaped member 112 and are fulcrumed in lugs 113 formed on the lower jaws. The springs 114 within the inclined parts of the hook-holding yoke are attached to the upper jaws on the sides of the fulcra opposite to the gripping ends of said jaws, holding the upper jaws normally resiliently in closed relation to the lower jaws, firmly gripping the heads 106 of the rear chain hooks. The upper jaws are provided also with extensions 112' which extend forwardly at the sides of the rear chain hooks, supporting the same in upright position, the ends of the extensions 112' projecting into recesses 115 formed in the outer sides of the rear chain hooks. The U-shaped member 112 is provided with a tire-engaging plate 116, and with a safety catch 117 consisting of a bolt 118 having a forwardly directed end 119 projecting within the hooked end of a latch 120. When the antiskid chain is drawn from the casing by rotation of the wheel the rear hook-holding yoke is pulled out, the sides thereof straddling the tire until the tire finally comes into contact with the safety catch 118 pushing the latter back against the tension of the catch spring 121 and releasing the end 119 of said catch from the hooked latch 120, leaving the U-shaped member 112 free to be tilted when pressure is brought upon the plate 116. Further movement of the rear hook-holding yoke toward the wheel brings said plate into contact with the wheel, the motion of the latter being downwardly so that the plate is depressed rocking the U-shaped member 112 upon the fulcra in the lugs 113 and opening the upper jaws against the tension of the springs 114. This also withdraws the extension 112' from the recess 115 in the rear chain hooks. It will be observed from Figure 23 that when this release movement of the upper jaw occurs the rear hook-holding yoke will have been pulled entirely out of the casing to a position in which the rear chain hooks lie in contact with the forward chain hooks and about to cooperate therewith, so that the lateral guidance afforded by the extensions 112' is no longer needed. It is also to be noted that on account of the direction of movement of the rear wheels during the tire chain applying operation, the rear hook-holding yoke will be inclined downwardly so that the lower shoulders 108 of the heads 106 will automatically slide from the gripping ends of the lower jaws, the rear tire hooks being thus completely disengaged from the hook-holders. The rear hook-holding yoke is fastened to cables 122 which in turn are secured to spiral springs 123 anchored at their forward ends in the front end of the casing 3. Immediately upon the release of the rear tire hooks, the rear hook-holding yoke will be pulled into the casing through the contraction of the springs 123.

The rear chain hooks are each formed on that side which comes adjacent the forward chain hooks when the parts assume the position shown in Figures 23 and 24, with flanges 124 and 125 co-acting with the flanges 126 and 127 on the forward chain hooks which have been previously described as affording means by which the forward chain hooks are held in the latches of the presenting carriage. The rear chain hooks are also provided with a stop 128 co-acting with a correspondingly shaped ledge 129 formed on the forward chain hooks, limiting the movement of one hook upon the other when said hooks become interengaged. When the chain has completely surrounded the tire, and the forward and rear-hooks have come to the relative position shown in Figure 23, the flanges 124 and 125 on the rear chain hooks begin to slide in the channels formed by the flanges 126 and 127 on the forward chain hooks, and this engaging movement continues until the co-acting hooks are fully interengaged, at which time a spring pressed detent 130 carried by each of the rear chain hooks slips into one of the recesses 131 on the bottom of the forward chain hook latching the parts against accidental displacement.

The presentations of the tire chains to the wheels by the carriages and gripping magazines may be done while the auto vehicle is stationary or in motion, but it is obvious that the application of the chains circumferentially to the wheels is accomplished by the rotation of said wheels, carrying the gripping magazines through one revolution of the wheels back to the point at which they first become engaged with the rims, at which point the rear hook-holding yoke becomes released and the hooks become interengaged and latched together. The anti-skid chains are now secured in position upon the wheels by means of the hooks which are a permanent part of the chains. The yokes 45 and the gripping magazines are still attached to the chains, and it is of course undesirable that they should be subjected to the buffetings incident to the travel of the vehicle, so that the latter is brought to a standstill and the yokes 45 and gripping magazines associated therewith are removed in the following manner. The forward chain hooks, it will be recalled are latched to the gripping magazines by means of the plunger 41. By withdrawing this plunger, each gripping magazine may be detached from its yoke by sliding the flanges 37 and 38 relative to the flanges 37' and 38' in an endwise direction. When the magazines are released, each pair, with the associated yoke may then be manipulated so as to draw it out from behind the chain, the latter when on the wheel being sufficiently slack to permit this withdrawal.

While the chains are on the wheels the yokes 45 and gripping magazines may be conveniently stowed away within the rearward parts of the casings 3, doors 132 being provided for this purpose.

When it is desired to remove the chains from the wheels, it is done by withdrawing the detent 130, thereby disconnecting the forward and rearward chain hooks. The slidable compartments of the casing are then pulled out, the rear chain hooks properly positioned within the rear hook holders, the chains laid smoothly along the undulating floor of the casings, the forward chain hooks secured in place upon the gripping magazines, and the latter together with the connecting yokes 45 placed in position between the jaws 29 and 30 of the latches of the carriage. The slidable compartments are then closed and the chain applying apparatus is again ready for action.

Having described my invention what I claim as new and desire to secure by Letters Patent is:—

1. In a skid chain applying device, wheel-gripping means carrying one end of a skid chain, means operable at will for presenting said wheel-gripping means operatively to a wheel, and tire-actuated means for initiating the gripping action of said wheel-gripping means.

2. In a skid chain applying device a yoke, wheel-gripping means carried by said yoke and adapted cooperably to grip a wheel from opposite sides, a skid chain carried at one end by said wheel-gripping means, means operable at will for presenting said wheel-gripping means operatively to a wheel, and tire-actuated means for initiating the gripping action of said wheel gripping means.

3. In a skid chain applying device, a yoke, wheel-gripping means carried by said yoke and adapted cooperably to grip a wheel from opposite sides, said wheel-gripping means including spurs projectable into engagement with the wheel, a skid chain held at one end of said wheel-gripping means, means operable at will for presenting said wheel-gripping means operatively to the wheel, and tire-actuated means for initiating the gripping action of said wheel-gripping means.

4. In a skid chain applying device, a yoke, wheel-gripping means carried by said yoke and adapted cooperably to grip a wheel from opposite sides, said wheel-gripping means including normally retracted spurs projectable into engagement with the wheel, means for biasing said wheel-gripping means toward said wheel, means for normally maintaining said wheel-gripping means away from said wheel against the tension of said biasing means, a skid chain held at one end by said wheel-gripping means, means operable at will for presenting said wheel-gripping means operatively to the wheel, and tire-actuated means for simultaneously releasing the means that inhibits the action of said biasing means and positively projecting said spurs into engagement with said wheel.

5. In a skid chain applying device a yoke, wheel-gripping means carried by said yoke and adapted cooperably to grip a wheel from opposite sides, a skid chain carried at one end by said wheel gripping means, means operable at will for presenting wheel-gripping means operatively to a wheel, first tire actuated means for initiating the gripping action of said wheel-gripping means and second tire actuated sections operating sequentially of said first tire actuating means for releasing said wheel-gripping means from said presenting means.

6. In a skid chain applying device a yoke, wheel-gripping means carried by said yoke and adapted cooperably to grip a wheel from opposite sides, a skid chain, forward and rearward hooks attached to said skid chain, said forward hooks being carried by said wheel-gripping means, means operable at will for presenting said wheel-gripping means operatively to the wheel, and tire actuated means for intiating the gripping action of said wheel-gripping means, said rearward and forward hooks interlocking upon completion of one revolution of said wheel-gripping means with said wheel.

7. In a skid chain applying device a yoke, wheel-gripping means carried by said yoke, and adapted cooperably to grip a wheel from opposite sides, a skid chain, forward and rearward hooks attached to said skid chain, said forward hooks being carried by said wheel-gripping means, means operable at will for presenting said wheel-gripping means operatively to a wheel, tire-actuated means for initiating the gripping action of said wheel-gripping means, means detachably holding the rearward chain hooks, yieldably resisting the paying out of said chain upon said wheel by rotation thereof, said forward and rearward hooks interlocking upon completion of one revolution of said wheel-gripping means with said wheel, said rearward-hook holding means being constructed to release said rearward hooks through pull of said skid chain immediately upon completion of said interlocking act of said forward and rearward hooks with said wheel.

8. In a skid chain applying device, a yoke, wheel-gripping means carried by said yoke and adapted cooperably to grip a wheel from opposite sides, said wheel-gripping means including normally retracted spurs projectable into engagement with the wheel, means for biasing said wheel-gripping means toward said wheel, means co-acting with said yoke for normally maintaining said wheel-gripping means away from said wheel against the tension of said biasing means, a skid chain, forward and rearward hooks attached to said skid chain, said forward hooks being carried by said wheel gripping means, means operable at will for presenting said wheel-gripping means operatively to the wheel, first tire-actuated means for simultaneously releasing the means that inhibits the action of said biasing means, and positively projecting said spurs into engagement with said wheel, second tire actuated means operative sequentially of said first tire actuated means for releasing said wheel-gripping means from said presenting means, means detachably holding the rearward chain hooks, yieldably resisting the paying out of said chain upon said wheel through rotation thereof, said forward and rearward hooks interlocking upon completion of one revolution of said wheel-gripping means with said wheel, said rearward hook holding means being constructed to release said rearward hooks through pull of said skid chain immediately upon completion of the interlocking act of said forward and rearward hooks.

9. In a skid chain applying device, a yoke, wheel-gripping means carried by said yoke and adapted cooperably to grip a wheel from opposite sides, said wheel-gripping means including normally retracted spurs, means for projecting said spurs into engagement with a wheel, a normally retracted spring for actuating said spur projecting means, means for biasing said wheel-gripping means toward said wheel, means for normally maintaining said wheel-gripping means away from said wheel against the tension of said biasing means, a skid chain held at one end by said wheel-gripping means, means operable at will for presenting said wheel-gripping means operatively to the wheel, and tire-actuated means for simultaneously releasing the means that inhibits the action of said biasing means, and releasing said spring to cause the operation of said spur-projecting means, to project said spurs into engagement with said wheel.

10. In a skid chain applying device, a yoke, wheel-gripping means carried by said yoke and adapted cooperably to grip a wheel from opposite sides, said wheel-gripping means including normally retracted spurs, means for projecting said spurs into engagement with a wheel, a normally retracted spring for actuating said spur-projecting means, means for biasing said wheel-gripping means toward said wheel, means for normally maintaining said wheel-gripping means away from said wheel against the tension of said biasing means, a skid chain held at one end by said wheel-gripping means, means operable at will for presenting said wheel-gripping means operatively to the wheel, and tire-actuated means for simultaneously releasing the means that inhibits the action of said biasing means, and releasing said spring to cause the operation of said spur-projecting means, to project said spurs into engagement with said wheel, said spur-projecting means being constructed to multiply the force transmitted by said spring.

11. In a skid chain applying device, a yoke, wheel-gripping means carried by said yoke and adapted cooperably to grip a wheel from opposite sides, said wheel-gripping means including normally retracted spurs, means for projecting said spurs into engagement with a wheel, a normally retracted spring for actuating said spur-projecting means, means for biasing said wheel-gripping means toward said wheel, means for normally maintaining said wheel-gripping means away from said wheel against the tension of said biasing means, a skid chain held at one end by said wheel-gripping means, means operable at will for presenting said wheel-gripping means operatively to the wheel, and tire-actuated means for simultaneously releasing the means that inhibits the action of said biasing means, and releasing said spring to cause the operation of said spur-projecting means, to project said spurs into engagement with said wheel, and motion retarding means intercalated in the operative connection between said spring and spur-projecting means.

12. In a skid chain applying device, a casing, flexible arched plates forming a floor within said casing increasing the effective length thereof, a carriage in the forward part of said casing movable toward a wheel, means for operating said carriage, wheel-gripping means releasably held by said carriage, chain tensioning means anchored in the rearward part of said casing and extensible to a point outside of the forward end of said casing, and a skid chain in said casing spread along the floor formed by said arched plates having the forward and rearward ends thereof releasably held respectively by said wheel-gripping means and tensioning means, said floor being constructed to collapse under the tension pressure of said chain when the latter is being withdrawn from said casing by said wheel-gripping means against the tension of said chain tensioning means.

13. In a skid chain applying device, a casing, flexible overlapping arched plates forming a floor for said casing increasing the effective length thereof, pins securing said plates to the bottom of said casing, said pins passing through registering slots in said plates, said slots affording lost motion permitting the collapse of said plates, a carriage in the forward part of said casing movable toward a wheel, means for operating said carriage, wheel-gripping means releasably held by said carriage, chain tensioning means anchored in the rearward part of said casing and extensible to a point outside of the forward end of said casing, and a skid chain in said casing spread along the floor formed by said arched plates having the forward and rearward ends thereof releasably held respectively by said wheel-gripping means and tensioning means, said floor being constructed to collapse under the tension-pressure of said chain when the latter is being withdrawn from said casing by said wheel-gripping means against the tension of said chain tensioning means.

In testimony whereof I have hereunto set my hand.

JACOB F. HERRING.